US011005636B2

(12) United States Patent
Qi

(10) Patent No.: US 11,005,636 B2
(45) Date of Patent: May 11, 2021

(54) CHANNEL STATE FEEDBACK METHOD AND APPARATUS IN COMMUNICATION SYSTEM

(71) Applicant: Samsung Electronics Co., Ltd, Suwon-si (KR)

(72) Inventor: Yinan Qi, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/611,205

(22) PCT Filed: Apr. 12, 2018

(86) PCT No.: PCT/KR2018/004267
§ 371 (c)(1),
(2) Date: Nov. 5, 2019

(87) PCT Pub. No.: WO2018/203604
PCT Pub. Date: Nov. 8, 2018

(65) Prior Publication Data
US 2020/0169374 A1   May 28, 2020

(30) Foreign Application Priority Data
May 5, 2017 (GB) ..................... 1707176

(51) Int. Cl.
*H04L 5/00* (2006.01)
*H04B 7/024* (2017.01)
(52) U.S. Cl.
CPC .......... *H04L 5/0057* (2013.01); *H04B 7/024* (2013.01); *H04L 5/0005* (2013.01); *H04L 5/0035* (2013.01)

(58) Field of Classification Search
CPC ... H04L 5/0057; H04L 5/0005; H04L 5/0035; H04L 2001/0092; H04L 1/0026;
(Continued)

(56) References Cited

U.S. PATENT DOCUMENTS

2006/0200724 A1  9/2006 Stankovic et al.
2009/0016415 A1* 1/2009 Chakrabarti ............ H03M 7/30
375/214
(Continued)

OTHER PUBLICATIONS

Ericsson, "Frequency parametrization for Type II CSI feedback", 3GPP TSG-RAN WG1 #88bis, Apr. 3-7, 2017, R1-1705927, 8 pages.
(Continued)

*Primary Examiner* — Kenneth T Lam

(57) ABSTRACT

A method and an apparatus for feeding back channel state information (CSI) of user equipment (UE) in a communication system are disclosed. The method comprises the steps of: receiving, from a base station, configuration information related to a plurality of CSI reports; identifying the setting of the plurality of CSI reports corresponding to a plurality of measurement resources, on the basis of the configuration information; generating a first CSI report corresponding to a first measurement resource and a second CSI report corresponding to a second measurement resource when the plurality of CSI reports are set; and transmitting the first CSI report and the second CSI report to the base station.

18 Claims, 5 Drawing Sheets

(58) Field of Classification Search
CPC ... H04L 1/0029; H04L 1/0031; H04L 5/0048; H04B 7/024; H04B 7/0658; H04B 7/0645; H04B 7/0689; H04B 7/0626; H04W 24/10
See application file for complete search history.

(56) References Cited

U.S. PATENT DOCUMENTS

| | | | |
|---|---|---|---|
| 2010/0128651 A1* | 5/2010 | Yim | H04B 7/15592 370/315 |
| 2010/0239036 A1* | 9/2010 | Koo | H04L 5/0035 375/260 |
| 2012/0177018 A1* | 7/2012 | Abraham | H04L 1/0027 370/338 |
| 2013/0010889 A1 | 1/2013 | Ponnampalam | |
| 2013/0114656 A1* | 5/2013 | Sayana | H04B 7/024 375/219 |
| 2013/0194943 A1 | 8/2013 | Davydov et al. | |
| 2013/0272250 A1 | 10/2013 | Shimezawa et al. | |
| 2013/0301450 A1* | 11/2013 | Geirhofer | H04B 7/024 370/252 |
| 2013/0322376 A1* | 12/2013 | Marinier | H04L 5/0057 370/329 |
| 2013/0336214 A1* | 12/2013 | Sayana | H04B 7/063 370/328 |
| 2013/0336244 A1* | 12/2013 | Kuo | H04L 1/0026 370/329 |
| 2014/0133336 A1 | 5/2014 | Park et al. | |
| 2015/0189644 A1* | 7/2015 | Lorca Hernando | H04B 7/0639 370/329 |
| 2016/0006487 A1* | 1/2016 | Ding | H04B 7/024 370/329 |
| 2019/0261329 A1* | 8/2019 | Park | H04B 7/08 |
| 2019/0334601 A1* | 10/2019 | Han | H04B 7/0645 |
| 2019/0335475 A1* | 10/2019 | Liang | H04W 72/0413 |
| 2020/0196383 A1* | 6/2020 | Tsai | H04W 72/042 |
| 2020/0244320 A1* | 7/2020 | Wang | H04L 5/0051 |

OTHER PUBLICATIONS

International Search Report dated Jul. 18, 2018 in connection with International Patent Application No. PCT/KR2018/004267, 2 pages.
Written Opinion of the International Searching Authority dated Jul. 18, 2018 in connection with International Patent Application No. PCT/KR2018/004267, 7 pages.
Supplementary European Search Report in connection with European Application No. 18794328.7 dated Mar. 2, 2020, 12 pages.
Hansel, Ralph, et al., "Improved Reconstruction for Distributed Video Coding," 2009 International Conference on Ultra Modern Telecommunications & Workshops, IEEE, Oct. 12-14, 2009, 5 pages.
Ong, Lawrence, et al., "Coding Strategies for Multiple-Access Channels With Feedback and Correlated Sources," IEEE Transactions on Information Theory, IEEE, vol. 53, No. 10, Oct. 2007, 22 pages.

* cited by examiner

CHANNEL STATE FEEDBACK METHOD AND APPARATUS IN COMMUNICATION SYSTEM

CROSS-REFERENCE TO RELATED APPLICATIONS

This application is a 371 of International Application No. PCT/KR2018/004267 filed on Apr. 12, 2018, which claims priority to Great Britain Patent Application No. 1707176.2 filed on May 5, 2017, the disclosures of which are herein incorporated by reference in their entirety.

BACKGROUND

1. Field

The present disclosure relates to a method and apparatus for signaling and receiving channel state information (CSI) feedback in coordinated multipoint (CoMP) systems.

2. Description of the Related Art

Non-coherent joint transmission (NCJT), which is a type of coordinated multipoint (CoMP) transmission, has a problem regarding CSI feedback. Multiple CSI reports are generally needed to conduct efficient radio resource allocation at coordinating base stations (BSs) because of multiple interference hypotheses. In other words, there are several different interference hypotheses, which should be reported back to the coordinating BSs to ensure efficient resource management.

For a joint transmission (JT) scheme, the data for one user equipment (UE) may be transmitted from multiple transmission/reception points (TRPs) in the same time-frequency resource, where the transmission can be performed in a coherent joint transmission way or an NCJT way. NCJT refers to a case where data of multiple layers is independently transmitted to a UE from different transmission points through MIMO transmission.

SUMMARY

Embodiments of the present disclosure may address shortcomings in the prior art, whether mentioned herein or not.

In particular, embodiments of the disclosure may address the problems associated with the magnitude of data required to fully provide channel state information to the coordinating BSs.

Embodiments of the disclosure provide a method and apparatus for identifying a correlation between CSI reports and efficiently compressing a CSI feedback signaling overhead by using the identified correlation.

According to the present disclosure there is provided an apparatus and method as set forth in the appended claims. Other features of the disclosure will be apparent from the dependent claims and the description which follows.

A method of transmitting channel state information (CSI) by a user equipment (UE) in a communication system according to an embodiment of the disclosure includes receiving configuration information related to a plurality of CSI reports from a base station (BS), determining based on the configuration information that the plurality of CSI reports corresponding to a plurality of measurement resources are configured, generating a first CSI report corresponding to a first measurement resource and a second CSI report corresponding to a second measurement resource, when the plurality of CSI reports are configured, and transmitting the first CSI report and the second CSI report to the BS.

A UE that transmits CSI in a communication system according to an embodiment of the disclosure includes a transceiver configured to receive configuration information related to a plurality of CSI reports from a BS and a processor configured to determine based on the configuration information that the plurality of CSI reports corresponding to a plurality of measurement resources are configured, generate a first CSI report corresponding to a first measurement resource and a second CSI report corresponding to a second measurement resource, when the plurality of CSI reports are configured, and transmit the first CSI report and the second CSI report to the BS.

A method of receiving CSI from a UE by a BS in a communication system according to an embodiment of the disclosure includes transmitting configuration information related to a plurality of CSI reports corresponding to a plurality of measurement resources to the UE, receiving a first CSI report corresponding to a first measurement resource and a second CSI report corresponding to a second measurement resource from the UE based on the configuration information, and processing the first CSI report and the second CSI report.

An apparatus of a BS that receives CSI from a UE in a communication system according to an embodiment of the disclosure includes a transceiver configured to transmit configuration information related to a plurality of CSI reports to the UE and receive a first CSI report corresponding to a first measurement resource and a second CSI report corresponding to a second measurement resource from the UE based on the configuration information and a processor configured to process the first CSI report and the second CSI report.

BRIEF DESCRIPTION OF THE DRAWINGS

For a better understanding of the disclosure, and to show how embodiments of the same may be carried into effect, reference will now be made, by way of example, to the accompanying diagrammatic drawings in which.

DETAILED DESCRIPTION

Figure 1A:
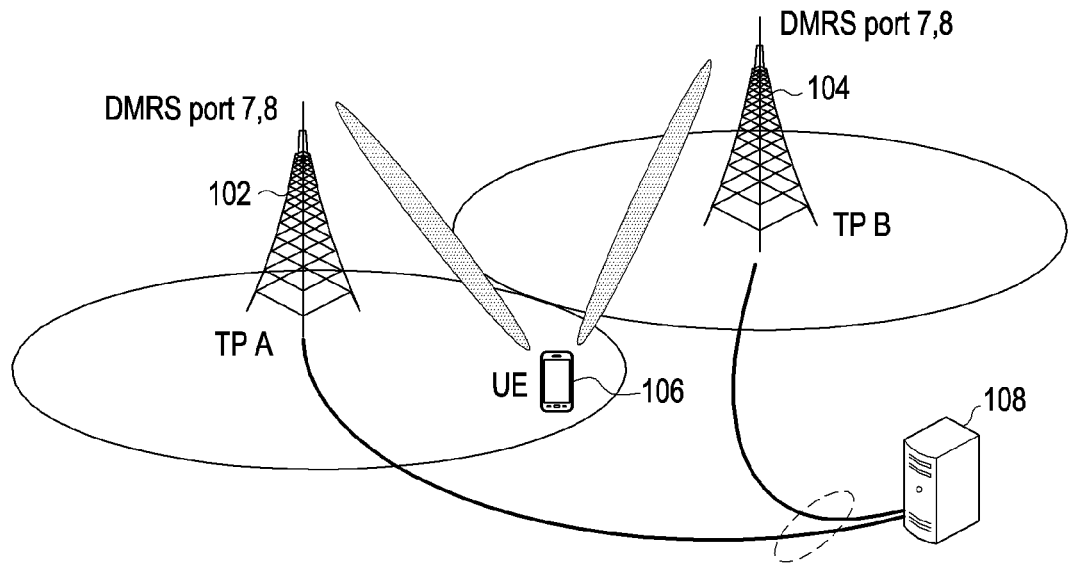
FIGS. 1A and 1B show, respectively, network configurations operating in coherent joint transmission and non-coherent joint transmission configurations.

Hereinafter, various embodiments of the present disclosure will be disclosed with reference to the accompanying drawings.

When embodiments of the disclosure are described, technical matters that are well known in a technical field of the disclosure and are not directly related to the disclosure will not be described. By omitting any unnecessary description, the subject matter of the disclosure will be more clearly described without being obscured.

For the same reasons, some elements will be exaggerated, omitted, or simplified in the attached drawings. The size of each element does not entirely reflect the actual size of the element. In each drawing, an identical or corresponding element will be referred to as an identical reference numeral.

Advantages and features of the disclosure and a method for achieving them will be apparent with reference to embodiments of the disclosure described below together with the attached drawings. However, the present disclosure is not limited to the disclosed embodiments, but may be implemented in various manners, and the embodiments are provided to complete the disclosure of the present disclosure and to allow those of ordinary skill in the art to understand the scope of the present disclosure, and the scope to be claimed of the present disclosure is defined by the category of the claims. Throughout the specification, an identical reference numeral will indicate an identical element.

It will be understood that each block of the flowchart and/or block diagram illustrations, and combinations of blocks in the flowchart and/or block diagram illustrations, may be implemented by computer program instructions. These computer program instructions may also be stored in a general-purpose computer, a special-purpose computer, or a processor of other programmable data processing devices, such that the instructions implemented by the computer or the processor of the programmable data processing device produce a means for performing functions specified in the flowchart and/or block diagram block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process, such that the instructions that execute the computer or other programmable apparatus may provide steps for implementing the functions specified in the flowchart and/or block diagram block or blocks.

In addition, each block represents a module, segment, or portion of code, which includes one or more executable instructions for implementing the specified logical function(s). It should also be noted that in other implementations, the function(s) noted in the blocks may occur out of the order indicated. For example, two blocks shown in succession may, in fact, be executed substantially concurrently or the blocks may sometimes be executed in the reverse order, depending on the functionality involved.

The term 'unit' used herein refers to a software or hardware element such as a field-programmable gate array (FPGA), an application specific integrated circuit (ASIC), etc., and '~unit' plays specific roles. However, the meaning of '~unit' is not limited to software or hardware. '~unit' may advantageously be configured to reside on the addressable storage medium and configured to reproduce one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and '~unit(s)' may be combined into fewer components and '~unit(s)' or further separated into additional components and '~unit(s)'. In addition, components and '~unit(s)' may be implemented to execute one or more CPUs in a device or a secure multimedia card.

Although the description of embodiments herein focuses primarily on wireless communication systems based on particular wireless access techniques, the subject matter of the present disclosure may also be applicable to other communication systems or services having similar technical backgrounds without departing from the scope of the present disclosure, and this may be determined by one of ordinary skill in the art.

In the present disclosure, embodiments related to a non-coherent joint transmission (NCJT) mode will be representatively described, and in the NCJT mode, multiple data streams may be transmitted from multiple base stations (BSs) to the same user. However, embodiments of the present disclosure may be expanded when multiple CSI reports need to be derived and fed back even in any coordinated multipoint (CoMP) mode or non-CoMP mode.

Figure 1B:
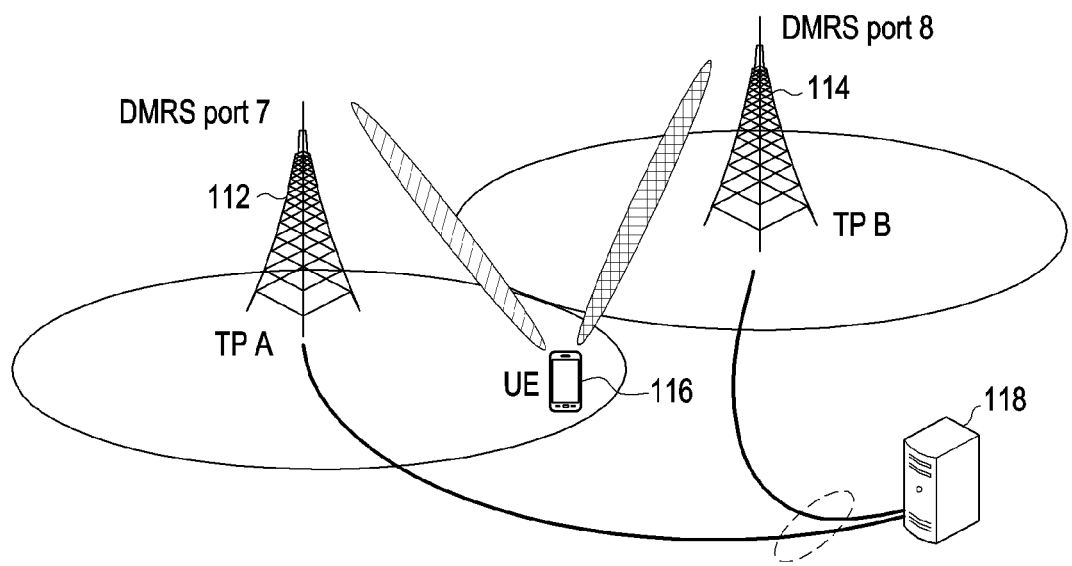

FIGS. 1A and 1B show, respectively, network configurations operating in coherent joint transmission and non-coherent joint transmission schemes.

Referring to FIG. 1A, data for a user equipment (UE) 106 may be transmitted from multiple transmission points (TPs) (herein, two TPs, i.e., a TP A 102 and a TP B 104 are shown). The TP A 102 and the TP B 104 may transmit radio signals for the UE 106 by using the same antenna ports and/or the same radio resources, e.g., demodulation reference signal (DMRS) ports 7 and 8. Each of the TPs 102 and 104 may be, for example, a BS, a Node B (NB), or an enhanced Node B (eNB). CJT based on the TPs 102 and 104 may be coordinated by a network entity 108. The network entity 108 may be implemented as, for example, a CoMP server.

Referring to FIG. 1B, data for a UE 116 may be independently transmitted from multiple TPs (herein, two TPs, i.e., a TP A 112 and a TP B 114 are shown). The TP A 112 and the TP B 114 may transmit radio signals for the UE 116 by using independent antenna ports and/or independent radio resources, e.g., the DMRS ports 7 and 8. Each of the TPs 112 and 114 may be, for example, a BS, an NB, or an eNB. NCJT based on the TPs 112 and 114 may be coordinated by a network entity 118. The network entity 118 may be implemented as, for example, a CoMP server.

Figure 2:
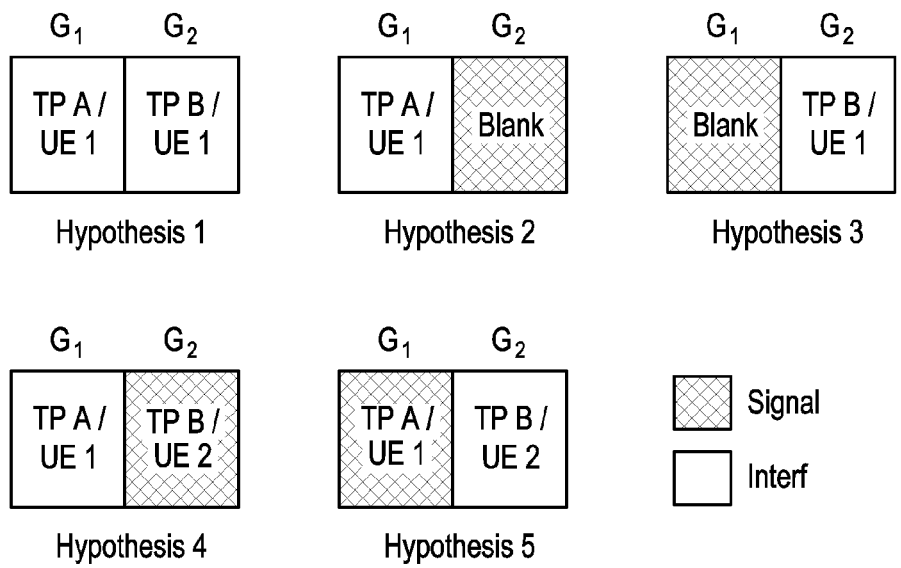
FIG. 2 shows signal and interference hypotheses corresponding to different network coordination methods.

FIG. 2 shows signal and interference hypotheses (or network coordination methods) that may be used to derive CSI.

Referring to FIG. 2, $G_1$ and $G_2$ respectively denote time-frequency resources corresponding to two TPs, i.e., a TP A (or referred to as a TRP A) and a TP B (or referred to as a TRP B). Depending on scheduling decision, a modulation and coding scheme (MCS) applied to transmission based on each TP should be selected considering these different interference types corresponding to the hypotheses. Shown signal and interference hypotheses 1 through 5 may be used to derive CSI that may be used for scheduling decision. The UE may measure at least one of the hypotheses 1 through 5 and derive the CSI based on a measurement result. At least one CSI report including the derived CSI may be transmitted to a serving TP or all or at least two coordinating TPs.

In the hypothesis 1, the TP A may transmit a signal for UE 1 through $G_1$, and the TP B may transmit a signal (that may be the same) for UE 1 by using $G_2$. In the hypothesis 2, the TP A may transmit a signal for UE 1 in $G_1$, and $G_2$ is blanked. The blanked $G_2$ may be used for interference measurement. In the hypothesis 3, the TP B may transmit a signal for UE 1 through $G_2$, and $G_1$ is blanked. The blanked $G_1$ may be used for interference measurement. In the hypothesis 4, the TP A may transmit a signal for UE 1 in $G_1$, and may work as interference with a signal for UE 2 transmitted by the TP B in $G_2$. In the hypothesis 5, the TP A may transmit a signal for UE 1 in G1, and may work as interference with a signal for UE 2 transmitted by the TP B in $G_2$.

For example, the BS may be configured to use NCJT for a first UE, UE 1, in one subframe, but the eNB may be configured to use dynamic point selection (DPS) for UE 1 in another subframe. In still another subframe, the BS may co-schedule a second UE, UE 2, as well as UE 1. To cope with these various interference scenarios, CSI feedback should be flexibly designed for feCoMP (further enhancements to CoMP). For UE's feedback to facilitate NCJT, a plurality of channel state information-reference signal (CSI-RS) resources and a plurality of CSI-interference measurement (CSI-IM) resources may be used. Examples of the CSI-RS resources and the CSI-IM resources are provided below.

A first CSI-RS resource used to estimate a channel of TP A;

A second CSI-RS resource used to estimate a channel of TP B;

A first CSI-IM resource used to estimate interference corresponding to interference types 1, 2, and 3;

A second CSI-IM resource used to estimate interference corresponding to interference type 4; and A third CSI-IM resource used to estimate interference corresponding to interference type 5.

Embodiments of the disclosure may relate to both CSI framework and CSI acquisition in CoMP for both 3GPP Long Term Evolution (LTE) and New Radio (NR).

The precoding and resource allocation of the coordinating TRPs involving CoMP may depend on CSI acquired from a UE and feedback by the UE. For NCJT from a plurality of TRPs, the UE may be configured to report one CSI or multiple CSI based on a plurality of signal and interference hypotheses (or network coordination methods), by upper-layer signaling, for example, radio resource control (RRC).

There may be options for CSI reporting of the UE as below.

1. Full set reporting: the UE reports CSIs respectively corresponding to all hypotheses;

2. Subset reporting: a network (e.g., an upper layer of a BS) dynamically triggers which CSI report or which subset of CSI report to be feedback.

In both options, multiple CSI reports are needed and a feedback overhead is therefore large. Through at least one of embodiments described below, signaling overhead is reduced, especially for the first option where the UE needs to feedback many CSI reports (e.g., 5 CSI reports corresponding to the hypotheses of FIG. 2), resulting in a possibly significant signaling overhead.

Embodiments of the disclosure may include sending, from a BS to a UE, an information element (IE) containing a list of measurement objects that define configurations of CSI-RS based radio resource management (RRM) measurements.

When a CSI report is triggered by the network and the UE needs to report a plurality of CSI reports (first option), these reports may be fed back separately in an independent manner, which may create a significant feedback signaling overhead. For the hypothesis 1 where two TRPs transmit the same signal to UE 1, the interference experienced by UE 1 when UE 1 decodes a data stream from the TRP A may be expressed as:

$$I_{H1}=I_{TRP21}+I_{TRP\_12}+N \quad \text{[Equation 1]}$$

$I_{Hi}$ is the interference received by UE 1 in hypothesis i, $I_{TRP21}$ is the interference from TRP B to UE 1 when TRP B transmits to UE 1, $I_{TRP\_12}$ is the interference from all other TRPs except for the TRP A and the TRP B, and N is the thermal noise.

For the hypothesis 2 where only the TRP A transmits to UE 1 and the TRP B stays silent, the interference experienced by UE 1 is:

$$I_{H2}=I_{TRP\_12}+N \quad \text{[Equation 2]}$$

For the hypothesis 3 where only the TRP A transmits to UE 1 and the TRP B transmits to UE 2, the interference experienced by UE 1 is:

$$I_{H4}=I_{TRP22}+I_{TRP\_12}+N \quad \text{[Equation 3]}$$

$I_{TRP22}$ is the interference from TRP B to UE 1 when TRP B transmits to UE 2.

From the above equations (1)-(3), it may be found that the interference levels of these hypotheses are not independent from each other but correlated in the sense that they have a common term $I_{TRP\_12}$, which means the corresponding CSI reports are also correlated.

This correlation between CSI reports can be exploited to reduce a feedback overhead.

One way to reduce the feedback overhead may be to feedback at least two correlated CSI reports together as a comprehensive CSI report. For example, one full CSI report and an 'offset' CSI report may be fed back to the serving TP from the UE. The full CSI report is referred to as a primary CSI report and the 'offset' report is referred to as a secondary CSI report. Each CSI report may include at least one of a channel quality indicator (CQI), a precoding matrix indicator (PMI), or a rank indicator according to a configuration based on a network.

The CQI may denote an MCS for a required block error rate (BLER) of a channel. The PMI may denote a precoding matrix indicating a scheme in which individual data streams (e.g., layers) are mapped to antenna ports. The RI may denote the number of layers transmitted and the number of different signal streams.

Next, an embodiment using CQI as an example will be described. For the hypothesis 2, the interference may exist from other TRPs only, and for the hypothesis 4, the interference may exist from other TRPs and the TRP B. When two CSI reports are needed, UE 1 may transmit a full CQI value for the hypothesis 2 (a primary CSI report) and an 'offset' CQI value for the hypothesis 4 (a secondary CSI report), based on the identified correlation between the two hypotheses (the hypotheses 2 and 4).

In other words, UE 1 may transmit a CSI report including $CQI_2$, which is the CQI value for the hypothesis 2, and $\Delta_{CQI}$, which is the CQI 'offset' between the hypothesis 2 and the hypothesis 4, caused by the additional interference from the TRP B to UE 1 when the TRP B transmits to UE 2. The CSI report may be transmitted to the serving BS, the TRP A, or to both the TRP A and the TRP B.

The TRPs may receive the CSI report, and acquire $CQI_4$ by using $CQI_2+\Delta_{CQI}$ included in the received CSI report, in which $CQI_4$ is a CQI for the hypothesis 4. To acquire $CQI_4$, each TRP may use a correlation between CSI reports corresponding to the identified correlation between the two hypotheses (the hypotheses 2 and 4) shared with UE 1. Since the range of $\Delta_{CQI}$ may be much smaller than the range pf values expected for $CQI_2$, fewer bits are needed to indicate $\Delta_{CQI}$. Therefore, the amount of feedback bits for CSI reporting may be reduced.

The CQI calculation may be treated as a quantization step to convert continuous CQI values into a limited number of bins, thus limiting a feedback overhead. A more efficient way to exploit the correlation between CSI reports is Slepian-Wolf coding (SWC). Slepian-Wolf coding has been selected since it is well known and relatively simple to implement. A skilled person will appreciate that other coding schemes, e.g., Wyner-Ziv coding, which exploit the correlation between the primary and secondary reports may be used instead.

SWC can be explained in a simple example as follows. Assume X and Y are equiprobable binary triplets with X, $Y \in \{0, 13\}^3$ that differ at most in one position. The entropies of X and Y are equal to 3 bits. When X and Y are encoded separately, 6 bits are required.

If Y is known, only four choices of X with equal probability are available. For example, when Y=000, $X \in \{000, 100, 010, 001\}$. Hence, only 2 extra bits are needed to indicate X The conditional entropy H(X|Y) is equal to 2 bits. For joint encoding of X and Y, three bits are needed to convey Y and two additional bits are needed to index the four possible choices of X associated with Y, such that instead of H(Y)+H(X)=6 bits, a total of H(X,Y)=H(Y)+H(X|Y)=5 bits are sufficient.

The same principle can be applied to CSI feedback, e.g., CQI feedback. When CQI calculation is treated as a quantization procedure, the minimal number of bits to carry a CQI feedback may be expressed as the entropy of CQI, H(CQI), as below.

$$R_{in}=H(CQI_1)+H(CQI_2)+H(CQI_4) \quad \text{[Equation 4]}$$

$R_{in}$ is the total number of bits needed and $H(CQI_i)$ is the entropy of CQI value for interference hypothesis i.

When SW coding is used, the number of bits needed for the CQI feedback is as follows:

$$R_{sw}=H(CQI_4|CQI_1,CQI_2)+H(CQI_1|CQI_2)+H(CQI_2) \quad \text{[Equation 5]}$$

$R_{sw}$ is the total number of bits needed when SWC is used, and $H(CQI_i|CQI_j)$ is the conditional entropy of CQI i conditioned on CQI j. The entropy has the following characteristics:

$$H(CQI_4|CQI_1,CQI_2)+H(CQI_1|CQI_2)+H(CQI_2) \leq H(CQI_1)+H(CQI_2)+H(CQI_4) \quad \text{[Equation 6]}$$

Therefore, $R_{sw} \leq R_{in}$, which means a smaller number of bits is required for a CQI feedback when SWC is used.

Figure 3A:
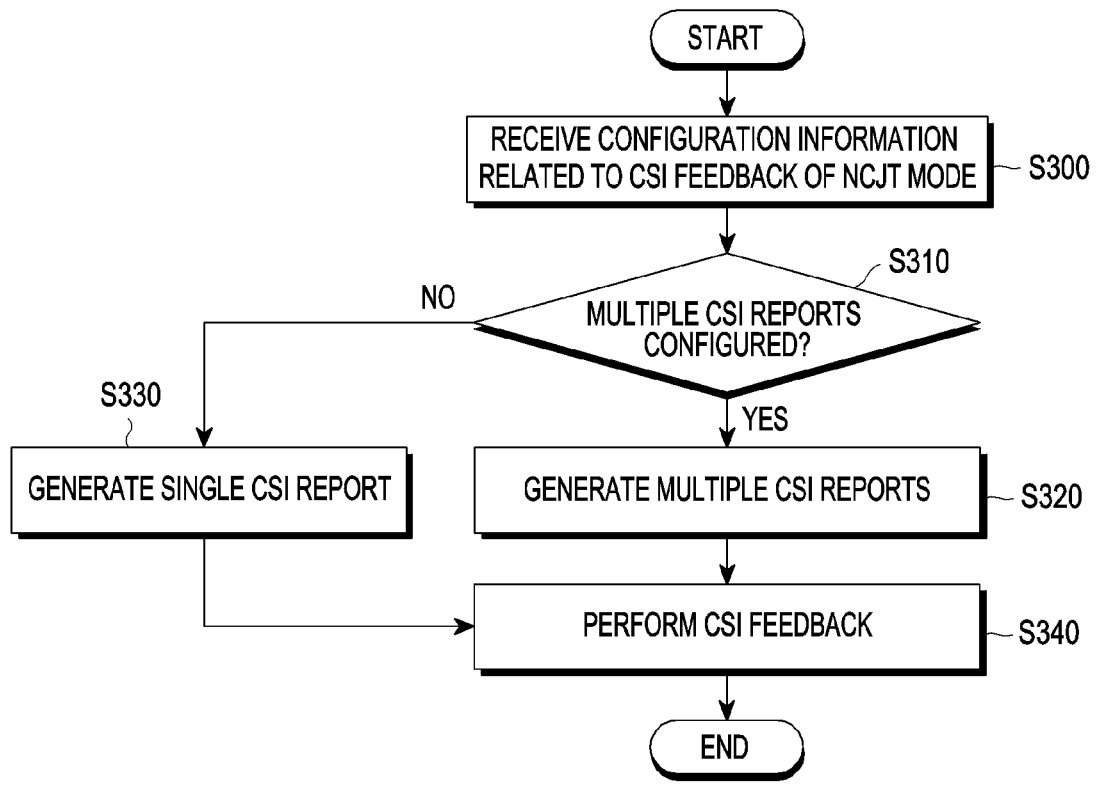
FIGS. 3A and 3B show a method according to an embodiment of the present disclosure.
Figure 3B:
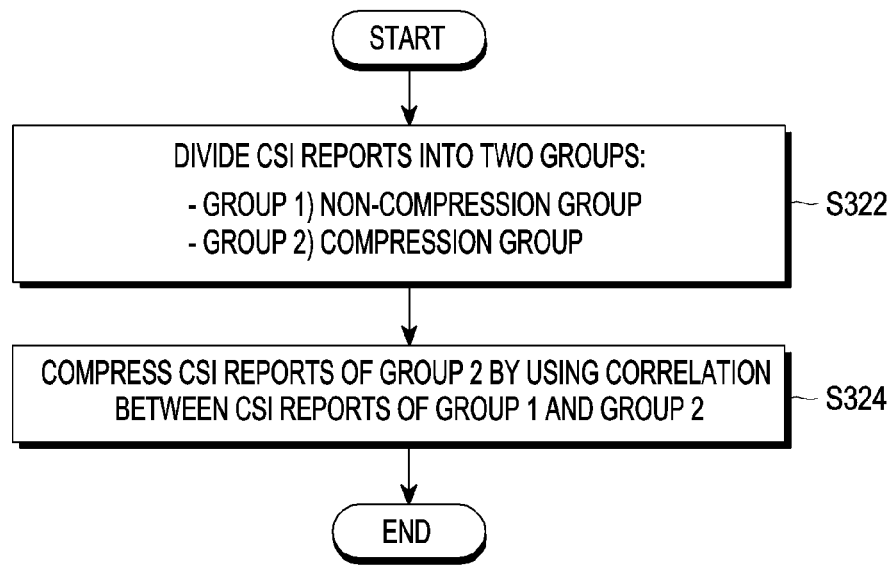

FIGS. 3A and 3B are flowcharts of a CSI feedback procedure of a UE, according to an embodiment of the present disclosure.

Referring to FIG. 3A, in operation S300, a UE may receive configuration information related to at least one CSI report from a BS (or at least two BSs associated with CoMP transmission of the UE). For example, the configuration information may be associated with a particular transmission mode, e.g., an NCJT mode or a CoMP mode. The UE may also receive configuration information indicating enabling of a particular transmission mode, e.g., the NCJT mode. Each piece of configuration information may be delivered by, for example, upper-layer signaling or downlink control information.

In operation S310, a determination may be made as to whether multiple CSI reports are configured by the configuration information. When a single CSI report is configured, the UE may generate the single CSI report based on the configuration information in operation S330 and go to operation S340. When a plurality of CSI reports are configured, the UE may generate the plurality of CSI reports based on the configuration information in operation S330 and go to operation S340.

The single CSI report or the plurality of CSI reports generated in operation S340 may be transmitted from the UE to the BS(s) based on the configuration information. The BS may receive the single CSI report or the plurality of CSI reports and schedule transmission to the UE. In an embodiment, when the plurality of CSI reports are received, the BS may determine CSI for each measurement resource configured for the UE by using a correlation between the CSI reports.

FIG. 3B shows detailed operations of operation S320 of FIG. 3A according to an embodiment of the disclosure.

Referring to FIG. 3B, in operation S322, a plurality of CSI reports for a plurality of measurement resources configured for the UE may be divided into two groups, e.g., a first group to which compression is not applied (at least one primary CSI report) and a second group to which compression is applied (at least one secondary CSI report).

In operation S324, the UE may compress a CSI report of the second group (the secondary CSI report). The compression may be performed, using a correlation between the primary CSI report and the secondary CSI report and correlated coding schemes, e.g., SWC. The UE may generate a comprehensive CSI report including the primary CSI report and the compressed secondary CSI report, in which the comprehensive CSI report may be transmitted from the UE to the BS in operation S340.

The comprehensive CSI report provided from the UE to the BS may include at least one primary CSI report and at least one secondary CSI report based on a configuration from the BS. In an embodiment, at least one primary CSI report may be provided in a non-compressed format. In an embodiment, at least one secondary CSI report may be compressed.

One or more secondary CSI reports may be derived, based on a correlation with one or more primary CSI reports. In an embodiment, a single primary CSI report may be used as the basis for a plurality of secondary CSI reports. In an embodiment, the plurality of primary CSI reports are used as a basis for the single secondary CSI report, or the plurality of primary CSI reports may be used as a basis for the plurality of secondary CSI reports.

When receiving the comprehensive CSI report from the UE, the BS may decompress/derive at least one secondary CSI report included in the comprehensive CSI report to extract information included therein, e.g., at least one of a CQI, a PMI, or an RI.

Figure 4A:
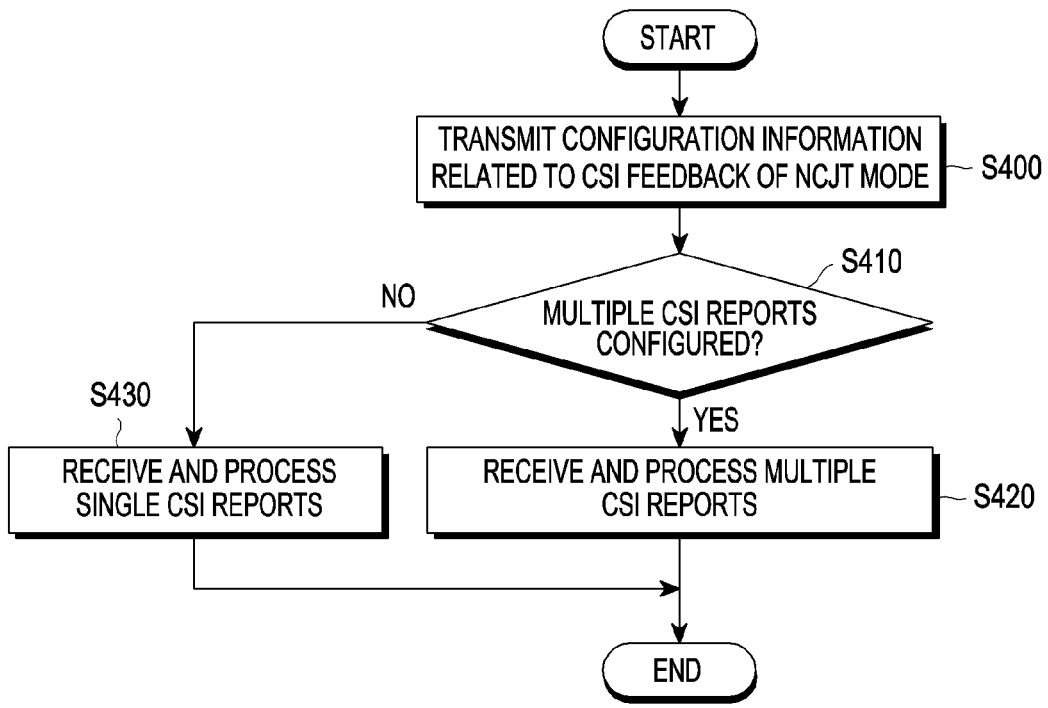
FIGS. 4A and 4B show a method according to an embodiment of the present disclosure.
Figure 4B:
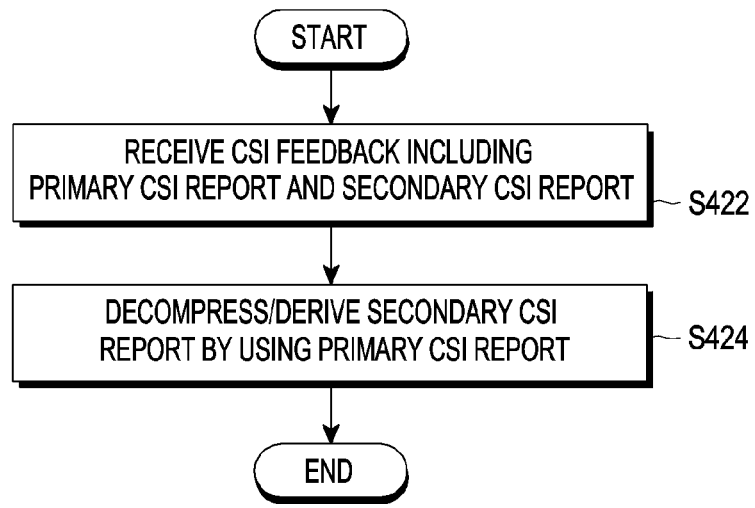

FIGS. 4A and 4B are flowcharts of a CSI feedback reception procedure of a BS, according to an embodiment of the present disclosure.

Referring to FIG. 4A, in operation S400, the BS may transmit configuration information related to at least one CSI report configured for the UE to the UE. For example, the configuration information may be associated with a particular transmission mode, e.g., an NCJT mode or a CoMP mode. The BS may also transmit configuration information indicating that a particular transmission mode, e.g., the NCJT mode is possible to the UE. Each configuration information may be transmitted to the UE by at least two BSs related to CoMP transmission of the UE. Each piece of configuration information may be delivered by, for example, upper-layer signaling or downlink control information.

In operation S410, the BS may determine whether a plurality of CSI reports for the UE is configured by the configuration information. When the single CSI report is configured, the BS may receive and derive the single CSI report from the UE based on the configuration information in operation S430. When the plurality of CSI reports are configured, the BS may receive and derive the plurality of CSI reports transmitted from the UE based on the configuration information in operation S420. In an embodiment, the BS may determine CSI for each measurement resource configured for the UE by using a correlation between the plurality of CSI reports.

FIG. 4B shows detailed operations of operation S420 of FIG. 4A according to an embodiment of the disclosure.

Referring to FIG. 4B, in operation S422, the BS may receive a comprehensive CSI report including at least one primary CSI report and at least one secondary CSI report from the UE. In operation S424, the BS may decompress/derive the at least one secondary report(s) to yield all required CSI information.

Figure 5:
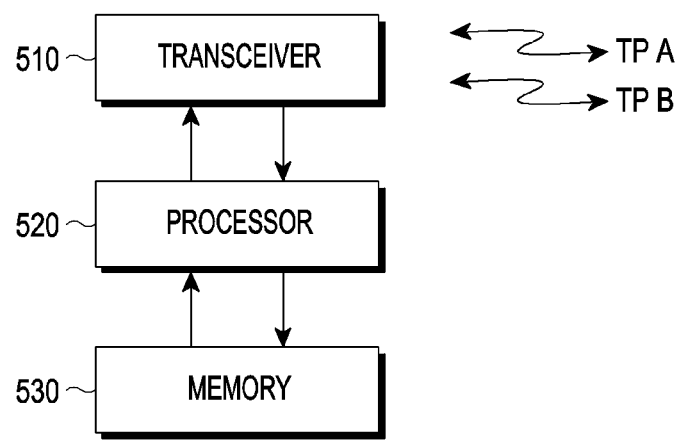
FIG. 5 is a block diagram of a user equipment (UE) according to an embodiment of the present disclosure.

FIG. 5 is a block diagram of a UE according to an embodiment of the present disclosure.

Referring to FIG. 5, the UE may include a transceiver 510, at least one processor 520, and a memory 530. The transceiver 510 may exchange a radio signal with one or more BSs (or TPs or TRPs). The processor 520 may be configured to operate according to at least one combination or at least two combinations of the above-described embodiments of the disclosure. For example, the processor 520 may acquire configuration information received from the BS, generate a single CSI report or a plurality of CSI reports for an enabled operation mode (e.g., the NCJT mode) based on the configuration information, and transmit the generated report(s) to the BS, according to the embodiment of FIGS. 3A and 3B. The memory 530 may store a parameter, data, and a program code needed for an operation of the processor 520.

Figure 6:
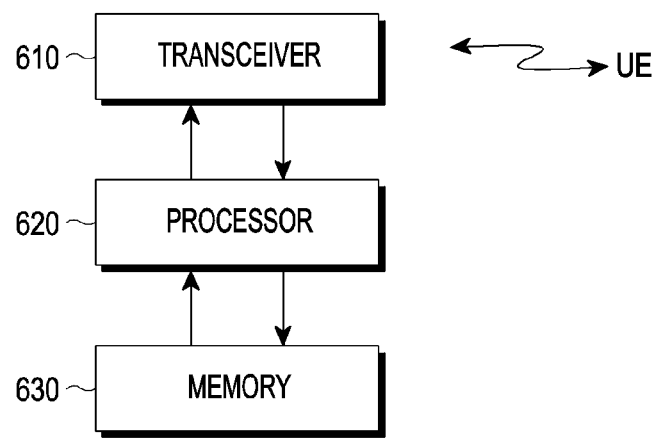
FIG. 6 is a block diagram of a base station (BS) according to an embodiment of the present disclosure.

FIG. 6 is a block diagram of a base station (BS) according to an embodiment of the present disclosure.

Referring to FIG. 6, the BS may include a transceiver 610, at least one processor 620, and a memory 630. The transceiver 610 may exchange a radio signal with the UE. The processor 620 may be configured to operate according to at least one combination or at least two combinations of the above-described embodiments of the disclosure. For example, the processor 620 may transmit configuration information for the UE to the UE and receive a single CSI report or a plurality of CSI reports for an enabled operation mode (e.g., the NCJT mode) from the UE based on the configuration information, according to the embodiment of FIGS. 4A and 4B. The memory 630 may store a parameter, data, and a program code needed for an operation of the processor 620.

Embodiments of the disclosure may reduce the amount of channel state feedback information that needs to be delivered from the UE to the BS(s) for an operation in the NCJT mode that may need a significant amount of feedback information.

Various embodiments of the present disclosure may also be implemented as a computer readable code in a computer readable recording medium in particular aspects. The computer readable recording medium may be any type of data storage device that may store data readable by a computer system. Examples of recording mediums readable by the computer may include a read-only memory (ROM), a random access memory (RAM), a compact disc-ROM (CD-ROM), magnetic tapes, floppy disks, optical data storage devices, carrier waves (such as data transmission through the Internet). The computer readable recording medium may be distributed through computer systems connected over a network, and thus the computer readable code is stored and executed in a decentralized manner. Further, functional programs, codes and code segments for achieving the present disclosure may be easily interpreted by programmers skilled in the art which the present disclosure pertains to.

The apparatus and method according to various embodiments of the present disclosure may be implemented by hardware, software, or a combination of hardware and software. Such software may be stored, whether or not erasable or re-recordable, in a volatile or non-volatile storage such as a read-only memory (ROM), a memory such as a random access memory (RAM), a memory chip, a device, or an integrated circuit; and an optically or magnetically recordable and machine (e.g., computer)—readable storage medium such as a compact disc (CD), a digital versatile disk (DVD), a magnetic disk, or a magnetic tape. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Accordingly, the present disclosure includes a program that includes a code for implementing the apparatus and method set forth in the appended claims of the specification and a machine (computer, etc.) readable storage medium for storing the program. The program may be electronically transferred through an arbitrary medium such as a communication signal delivered through a wired or wireless connection, and the present disclosure properly includes equivalents thereof.

The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

Meanwhile, the embodiments disclosed in the present specification and drawings have been provided to easily describe the present disclosure and to help with the understanding of the present disclosure, and are not intended to limit the scope of the present disclosure. While the foregoing embodiments of the present disclosure have been shown and described as examples, it will be apparent to those of ordinary skill in the art that modifications and variations can be made without departing from the spirit and scope of the embodiments as defined by the appended claims. Therefore, the true technical scope of the present disclosure should be defined by the appended claims.

The invention claimed is:

1. A method of transmitting channel state information (CSI) by a user equipment (UE) in a communication system, the method comprising:
receiving, from a base station (BS), configuration information via radio resource control (RRC) signaling, the configuration information comprising information indicating whether CSI feedback based on a non-coherent joint transmission (NCJT) mode is configured to the UE;

generating a first CSI and a second CSI, in response to identifying that the CSI feedback based on the NCJT mode is configured by the configuration information; and transmitting the first CSI and the second CSI to the BS, wherein, in case that the CSI feedback based on the NCJT mode is configured, the configuration information includes information configuring two CSI reference signal (CSI-RS), resources and information configuring at least one CSI interference measurement (CSI-IM), resource, and wherein the two CSI-RS resources include a first CSI-RS resource corresponding to the first CSI and a second CSI-RS resource corresponding to the second CSI.

2. The method of claim 1, wherein the first CSI comprises non-compressed CSI, and the second CSI comprises compressed CSI.

3. The method of claim 1, wherein the second CSI is generated using a correlation between the first CSI and the second CSI.

4. The method of claim 1, wherein the second CSI comprises CSI compressed by Slepian-Wolf coding.

5. The method of claim 1, wherein each of the first CSI and the second CSI includes at least one of a channel quality information (CQI), a precoding matrix indicator (PMI), or a rank indicator (RI).

6. A user equipment (UE) that transmits channel state information (CSI) in a communication system, the UE comprising:

a transceiver configured to receive, from a base station (BS), configuration information via radio resource control (RRC) signaling, the configuration information comprising information indicating whether CSI feedback based on a non-coherent joint transmission (NCJT) mode is configured to the UE; and a processor configured to generate a first CSI and a second CSI, in response to identifying that the CSI feedback based on the NCJT mode is configured by the configuration information, and transmit, to the BS, the first CSI and the second CSI, wherein, in case that the CSI feedback based on the NCJT mode is configured, the configuration information includes information configuring two CSI reference signal (CSI-RS), resources and information configuring at least one CSI interference measurement (CSI-IM), resource, and wherein the two CSI-RS resources include a first CSI-RS resource corresponding to the first CSI and a second CSI-RS resource corresponding to the second CSI.

7. The UE of claim 6, wherein the first CSI comprises non-compressed CSI, and the second CSI comprises compressed CSI, and wherein the second CSI is compressed using a correlation between the first CSI and the second CSI.

8. The UE of claim 6, wherein the second CSI comprises CSI compressed by Slepian-Wolf coding.

9. The UE of claim 6, wherein each of the first CSI and the second CSI includes at least one of a channel quality information (CQI), a precoding matrix indicator (PMI), or a rank indicator (RI).

10. A method of receiving channel state information (CSI) by a base station (BS) in a communication system, the method comprising:

transmitting, to a user equipment (UE), configuration information via radio resource control (RRC) signaling, the configuration information comprising information indicating whether a CSI feedback based on a non-coherent joint transmission, NCJT, mode is configured to the UE;

receiving a first CSI and a second CSI from the UE in case that the CSI feedback based on the NCJT mode is configured to the UE based on the configuration information; and processing the first CSI and the second CSI, wherein, in case that the CSI feedback based on the NCJT mode is configured, the configuration information includes information configuring two CSI reference signal, CSI-RS, resources and information configuring at least one CSI interference measurement, CSI-IM, resource, and wherein the two CSI-RS resources include a first CSI-RS resource corresponding to the first CSI and a second CSI-RS resource corresponding to the second CSI.

11. The method of claim 10, wherein the first CSI comprises non-compressed CSI, and the second CSI comprises compressed CSI.

12. The method of claim 10, wherein the second CSI is generated using a correlation between the first CSI and the second CSI.

13. The method of claim 10, wherein the second CSI comprises CSI compressed by Slepian-Wolf coding.

14. The method of claim 10, wherein each of the first CSI and the second CSI includes at least one of a channel quality information (CQI), a precoding matrix indicator (PMI), or a rank indicator (RI).

15. An apparatus of a base station (BS) that receives channel state information (CSI) in a communication system, the apparatus comprising:

a transceiver configured to transmit, to a user equipment (UE), configuration information via radio resource control (RRC) signaling, the configuration information comprising information indicating whether a CSI feedback based on a non-coherent joint transmission, NCJT, mode is configured to the UE; and a processor configured to process a first CSI and second CSI, wherein, in case that the CSI feedback based on the NCJT mode is configured, the configuration information includes information configuring two CSI reference signal, CSI-RS, resources and information configuring at least one CSI interference measurement, CSI-IM, resource, and wherein the two CSI-RS resources include a first CSI-RS resource corresponding to the first CSI and a second CSI-RS resource corresponding to the second CSI.

16. The apparatus of claim 15, wherein the first CSI comprises non-compressed CSI, and the second CSI comprises compressed CSI, and wherein the second CSI is compressed using a correlation between the first CSI and the second CSI.

17. The apparatus of claim 15, wherein the second CSI comprises CSI compressed by Slepian-Wolf coding.

18. The apparatus of claim 15, wherein each of the first CSI and the second CSI includes at least one of a channel quality information (CQI), a precoding matrix indicator (PMI), or a rank indicator (RI).

* * * * *